(12) United States Patent
Aldissi

(10) Patent No.: US 7,097,757 B1
(45) Date of Patent: Aug. 29, 2006

(54) POLYMERS HAVING AN ORDERED STRUCTURAL STATE

(75) Inventor: Matt Aldissi, Belleair Beach, FL (US)

(73) Assignee: Fractal Systems, Inc., Safety Harbor, FL (US)

( * ) Notice: Subject to any disclaimer, the term of this patent is extended or adjusted under 35 U.S.C. 154(b) by 366 days.

(21) Appl. No.: 10/207,597

(22) Filed: Jul. 30, 2002

(51) Int. Cl.
C25B 1/00 (2006.01)
C25B 1/24 (2006.01)
C25B 3/00 (2006.01)
C25B 3/08 (2006.01)
B01D 57/02 (2006.01)

(52) U.S. Cl. .............. 205/339; 205/414; 205/419; 205/422; 205/423; 205/455; 205/460; 205/478; 205/489; 204/471

(58) Field of Classification Search ........ 205/339, 205/414, 419, 478, 489, 422, 423, 455, 460; 204/478, 489, 471
See application file for complete search history.

(56) References Cited

U.S. PATENT DOCUMENTS

| | | | |
|---|---|---|---|
| 4,929,389 A | 5/1990 | Aldissi | 252/500 |
| 4,954,607 A | 9/1990 | Otani et al. | 528/230 |
| 5,777,292 A | 7/1998 | Grigorov et al. | 204/157.15 |
| 5,834,128 A * | 11/1998 | Hamahara et al. | 428/626 |

FOREIGN PATENT DOCUMENTS

JP 03190922 A * 8/1991

* cited by examiner

Primary Examiner—Edna Wong
(74) Attorney, Agent, or Firm—Mark Levy & Associates, PLLC; David L. Banner (57) ABSTRACT

A new class of polymers with a highly ordered state having unique electrical, electronic, optical, ferromagnetic, piezoelectric, ionic, or superconducting properties are achieved. The polymers are highly crystalline, exhibiting both long and short range order, and an associated nanoscale lattice parameter. The polymers are fabricated by forming a conductive set of nanoscale waveguides (composed of functional molecules and charge carriers, i.e., polarons, bipolarons, superpolarons, spins, ions, copper pair electrons) throughout a polymer lattice. These "molecular waveguides" are characterized by a width or diameter comparable to the size of the lattice cell.

5 Claims, 15 Drawing Sheets

Polypyrrole

Fig. 4a

Poly(ethylenedioxythiophene)

POLYMERS HAVING AN ORDERED STRUCTURAL STATE

FIELD OF THE INVENTION

The present invention relates to a method and apparatus for fabricating ordered structural polymers having unique properties, and the polymer compositions resulting from the fabrication method.

BACKGROUND OF THE INVENTION

Present day electrical conductivity in polymers has been limited to a few hundred S/cm due to a large number of defects that are present in the polymer structure. The defects occur during the fabrication processes. The electrical resistance that develops in such materials derives from the potential barrier created by these defects. The charge carrier hops between domains (i.e., chains, chain segments, molecules). This has limited their use in numerous applications where metal-like conductivity is desired. Several efforts to improve their properties have resulted in increased conductivity of up to $10^4$ S/cm. This is around two orders of magnitude lower than copper.

Ferromagnetic materials have spin alignments within ferromagnetic domains, which are typically associated with inorganic materials like iron and iron oxides. There have been several reports of organic molecules that exhibit ferromagnetism but this is typically at cryogenic temperatures (below 10° K.). Applications using ferromagnetism have been typically limited to inorganic materials fired at high temperatures and are typically brittle and subject to fracture.

Piezoelectric materials result from the generation of electrical polarity in certain dielectric substances in response to an applied mechanical pressure. Inorganic substances, or ceramics like lead zirconate titanate (PZT-4) or barium titanate (BaTiO3) are well known in this art, and are frequently used in transducers, microphones, loudspeakers, ultrasound generators, etc. The best known piezoelectric polymer (through poling) is PVF2 or poly(vinylidene fluoride) having the formula (CF2CH2)n. Although PVF2 has proved to be useful in some applications due to its formability, light weight, and flexibility, its piezoelectric coefficient is 5 to 10 times lower than those of used ceramics.

In considering polymers that exhibit ionic conductivity, years of concentrated research and development efforts have focused upon polymer electrolytes. Polymer electrolytes with a high conductivity are considered to be useful in various electrochemical devices like lithium and lithium ion batteries. Replacing liquid electrolytes is desirable because they are generally toxic, and have poor low transference numbers. Polymer electrolytes known to enhance transference numbers take up little space and act as separators between electrodes. Their present day conductivity, however, only reaches a maximum $10^4$ S/cm. This is two orders of magnitude lower than their liquid counterparts.

Superconducting materials have perfect diamagnetism, and have been utilized in the field of power generation and transmission. Well known examples are some metals at ≈10° K. and ceramics around 100° K. More recently, the transition temperature has been doubled for fullerene single crystals to 117° K., by expanding the lattice via doping with chloroform and bromoform. These materials induce positive-charge-carrying holes into the crystal. It is hypothesized that the typical molecular waveguide must be of at least a critical width or diameter (approximately five nanometers) in order to permit superconductivity at or above room temperature.

At some elevated temperature, one might anticipate that the amplitude of thermal lattice vibrations would begin to overwhelm the guiding influence of the molecular waveguides, and interfere with the freely flowing Cooper pairs. The behavior of superconductors suggests that electron pairs are coupling over a range of hundreds of nanometers, three orders of magnitude larger than the lattice spacing. These so-called Cooper pairs of coupled electrons can take the character of a boson and condense into the ground state. This pair condensation is the basis for the BCS theory of superconductivity. The effective net attraction between the normally repulsive electrons produces a pair binding energy on the order of milli-electron volts, enough to keep them paired at extremely low temperatures. Condensed matter physicists may scoff at this relatively simplistic explanation of pinched-off Cooper pair flow, to account for non-superconductive behavior in ordinary polymers, as well as in other materials. However, it should be observed that this generation has witnessed a tenfold increase in critical temperature for superconductivity that is coincidental with an increase in lattice parameter (i.e., from less than 0.5 nanometer for niobium inter-metallic materials, to nearly one nanometer for yttrium barium copper oxide and related superconducting ceramics of perovskite structure).

Conductivity measurements at elevated temperatures suggest that the subject polymers exhibit superconductive behavior from absolute zero up to their respective softening point temperatures (where complete structural disorder takes place).

Intrinsically conductive polymers are known to exhibit interesting optical properties with well-defined absorption states ranging from the visible to the infrared. Such polymers have proved useful in electrochromics, light emission, and light polarization. Their nonlinear optical properties (i.e., waveguides), transparent shielding coatings, etc., are also well known. Previous partial ordering/orientation of conducting polymers have resulted in materials with a modified absorption spectrum in the visible, and a large anisotropy (ratio of absorption in the parallel direction to that in the perpendicular direction).

The present invention seeks to produce polymers having uniquely ordered structures and properties. The polymers of the current invention are fabricated by deposition from polymer solutions using an electrophoretic process and apparatus, or by direct polymerization from monomer solutions using electrochemical polymerization, with each process occurring within a magnetic field. The use of the combination of an electric field and a magnetic field produce polymers having a high short range and long range order. Such polymers form nanoscale waveguides for the appropriate charge carriers. The subject polymers can be of the class of conjugated polymers such as polypyrrole, polythiophene, etc., or saturated polymers such as PVF2, polymethacrylate (PMA), triarylmethane polymers, poly(ethylene oxide), or PEO. Conjugated polymers can be obtained using either of the two deposition processes mentioned above, while the saturated polymers are formed using the electrophoretic process from their corresponding solutions. All the processes involved in the formation of these inventive polymers take place at room temperature with no special requirements except for the application of the correct fields. The polymer materials produced according to the inventive methods display unique electric, electronic, ionic, ferromagnetic, piezoelectric, or superconductive properties at ambient temperatures.

DISCUSSION OF RELATED ART

In U.S. Pat. No. 4,929,389, issued on May 29, 1990 to Mahmoud Aldissi for WATER-SOLUBLE CONDUCTIVE POLYMERS, water soluble, electrically conductive polymers are illustrated. The monomer repeat structure comprises a thiophene, or pyrrole. The polymers are synthesized by an electrochemical process using a dopant to increase the conductivity.

In U.S. Pat. No. 4,954,607, issued to Octani et al on Sep. 4, 1990 for FERROMAGNETIC ORGANIC SUBSTANCE HAVING TRIARYL METHANE STRUCTURE AND PROCESS FOR MANUFACTURING THE SAME, a ferromagnetic organic substance is illustrated, having a triaryl methane structure. The substance is fabricated by polycondensing a polynuclear aromatic compound or an electron donating group substituted monocyclic aromatic compound with an aromatic aldehyde in the presense of an acid catalyst to produce a precondensate, and then subjecting the precondensate to dehydrogenation and purification.

In U.S. Pat. No. 5,777,292 issued to Grigorov et al on Jul. 7, 1998 entitled MATERIALS HAVING HIGH ELECTRICAL CONDUCTIVITY AT ROOM TEMPERATURES AND METHODS FOR MAKING SAME, a polymer fabricating method for producing a highly conductive polymer is depicted. The polymer in the form of a film is produced by depositing a macromolecular, liquid polymer upon a substrate, ionizing the substance, and applying a strong electric field to join polarons together to form conducting threads.

SUMMARY OF THE INVENTION

In accordance with the present invention, a method and apparatus for producing polymers having uniquely ordered structures and properties is described. The polymers are fabricated by deposition from polymer solutions using an electrophoretic process and apparatus, or by direct polymerization from monomer solutions using electrochemical polymerization, with each process occurring within a magnetic field. The use of the combination of an electric field and a magnetic field produce polymers having a high short range and long range order. Such polymers form nanoscale waveguides for the appropriate charge carriers. The subject polymers can be of the class of conjugated polymers such as polypyrrole, polythiophene, etc., or saturated polymers such as PVF2, polymethacrylate (PMA), triarylmethane polymers, poly(ethylene oxide), or PEO. Conjugated polymers can be obtained using either of the two deposition processes mentioned above, while the saturated polymers are formed using the electrophoretic process from their corresponding solutions. All the processes involved in the formation of these inventive polymers take place at room temperature with no special requirements except for the application of the correct fields. The polymer materials produced display unique electric, electronic, ionic, ferromagnetic, piezoelectric, or superconductive properties at ambient temperatures.

It is an object of this invention to provide a polymer fabricating method and apparatus, and unique polymers produced by the method and apparatus, that have high short range and long range ordered structures.

It is another object of the invention to provide a method of fabricating unique polymers from solutions subject to electrical and magnetic fields.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a method of fabricating polymers having a unique structural order that gives rise to unusual properties. The polymers are fabricated by deposition from polymer solutions using an electrophoretic process and apparatus, or by direct polymerization from monomer solutions using electrochemical polymerization, with each process occurring within a magnetic field.

EXAMPLES

Figure 1:
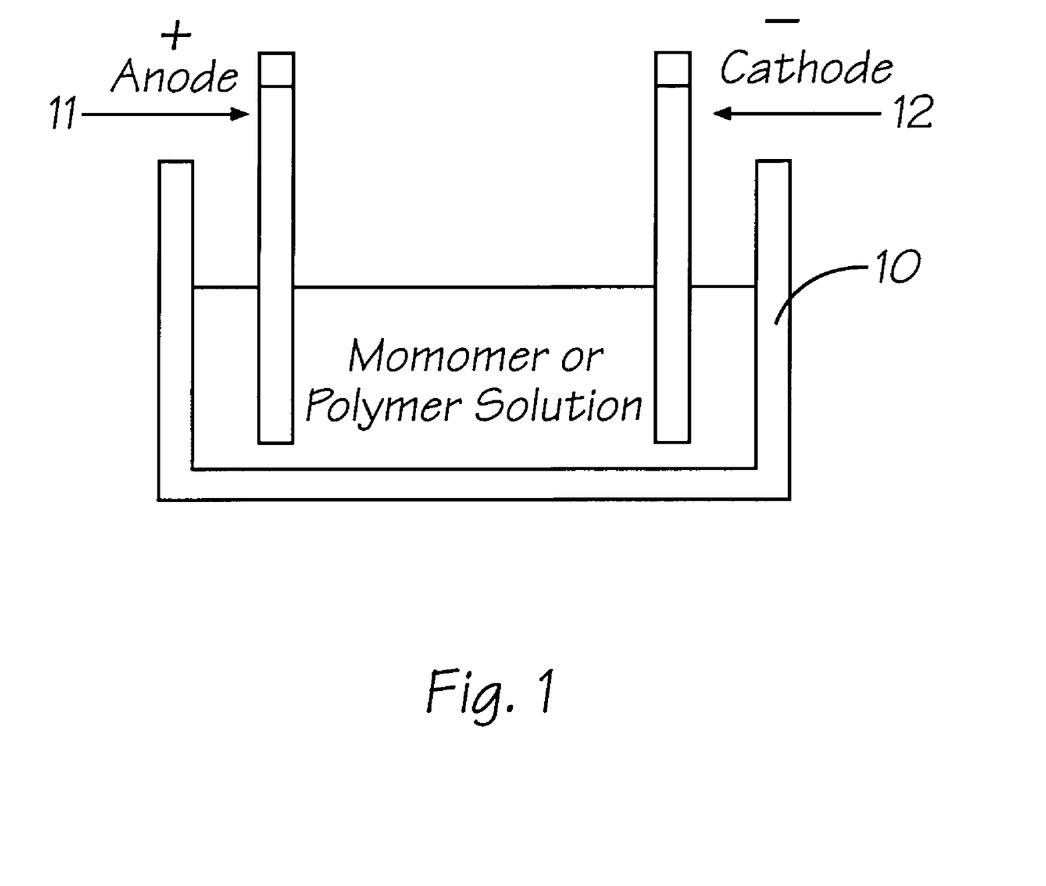
FIG. 1 illustrates a schematic of a typical electrophoretic or electrochemical apparatus used to fabricate the unique polymers of this invention.
Figure 2:
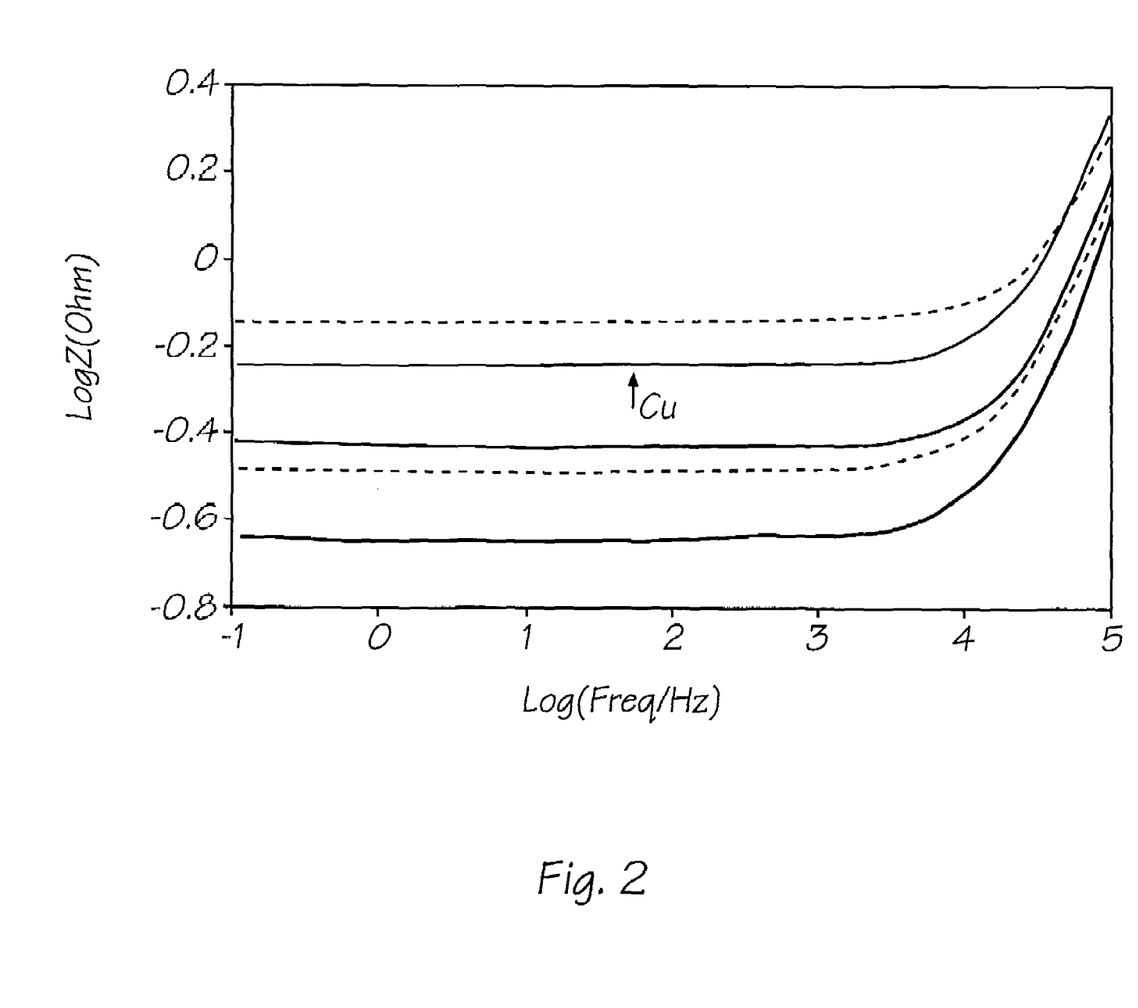
FIG. 2 depicts a graph showing impedance characteristics for copper-containing, high conductivity polymers.
Figure 10:
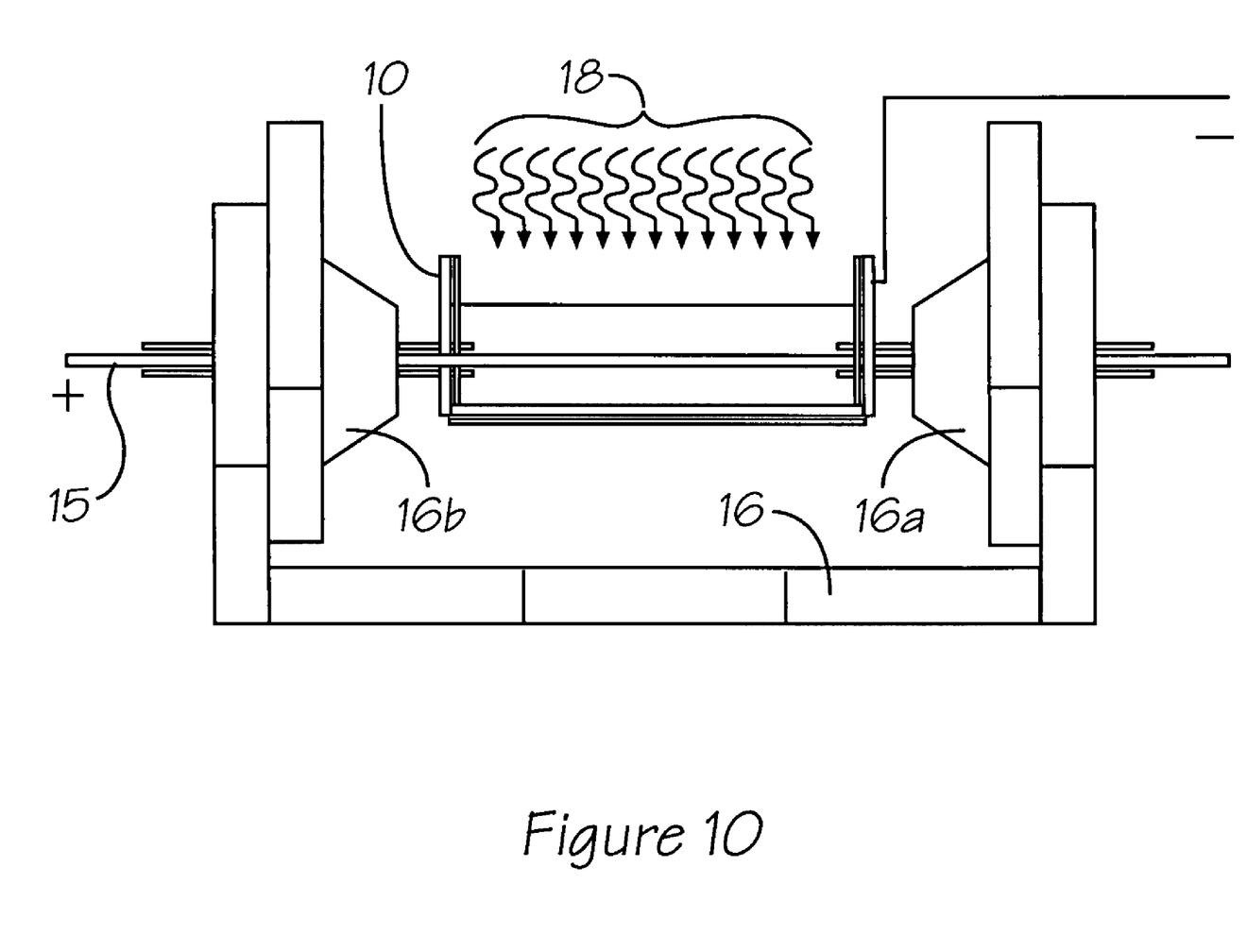
FIG. 10 illustrates an apparatus for fabricating the polymers of this invention.

1) An aqueous solution containing 0.2 M pyrrole or ethylenedioxythiophene monomer, and 0.2 M p-toluene sulfonate is placed in a non-magnetic container 10 (i.e., glass, Teflon®, etc.) with two non-magnetic metallic electrodes (anode 11 and cathode 12) comprising either gold, platinum, stainless steel, titanium, indium, or tin oxide, etc., as depicted in FIG. 1. The apparatus is placed in the center of an electromagnet 16, similar to that shown in FIG. 10. As is well known to those of skill in the art, all electromagnets have two poles, such poles being an inherent characteristic of any magnet. For the sake of convenience, the inherent poles of electromagnet 16 are identified by reference numbers 16a and 16b. An electric field of <1V to 10 V, versus an Ag/AgCl reference electrode, is applied across the anode 11 and cathode 12, while a magnetic field (a fraction of Kgauss, and higher) is generated by the electromagnet 16 and applied parallel to the electric field generated between electrodes 11 and 12. A high conductivity coating, or film is deposited on the anode 11. The film or coating thickness increases with deposition time. Volume conductivity of the resulting polymer, exceeds that of copper, as evidenced by the impedance values shown in FIG. 2.

Figure 3:
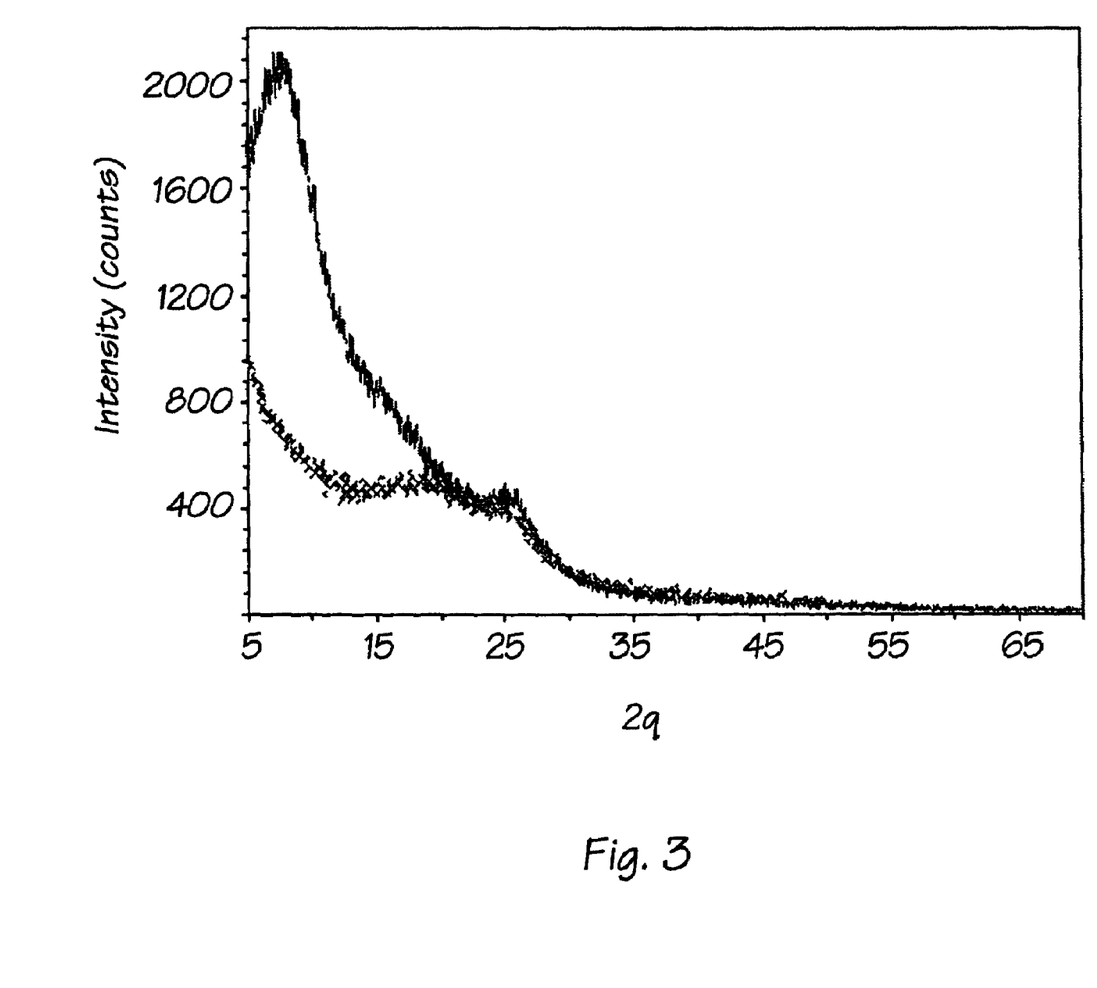
FIG. 3 shows a plot of X-ray diffraction for polypyrrole with and without application of a magnetic field.
Figure 4A:
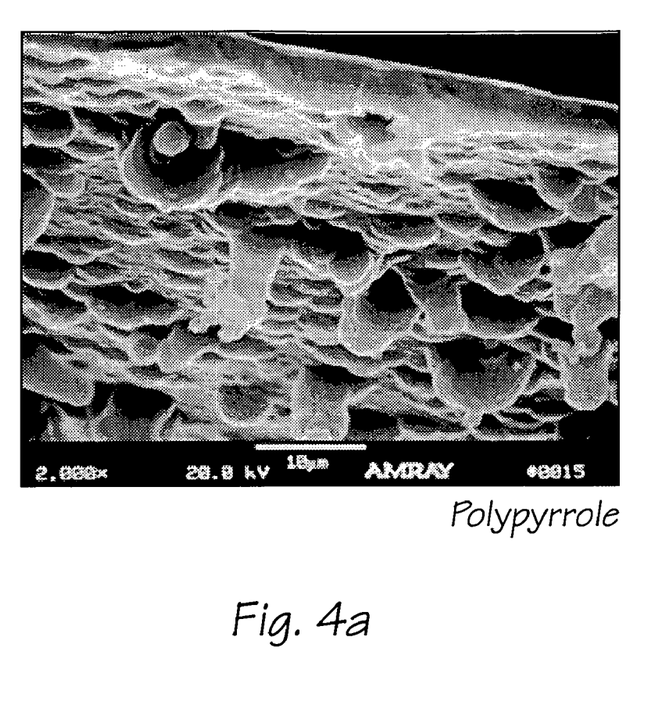
FIGS. 4a and 4b, illustrate scanning electron micrographs for polypyrrole and poly(ethylenedioxythiophene), respectively, showing an ordered structure thereof.
Figure 4B:
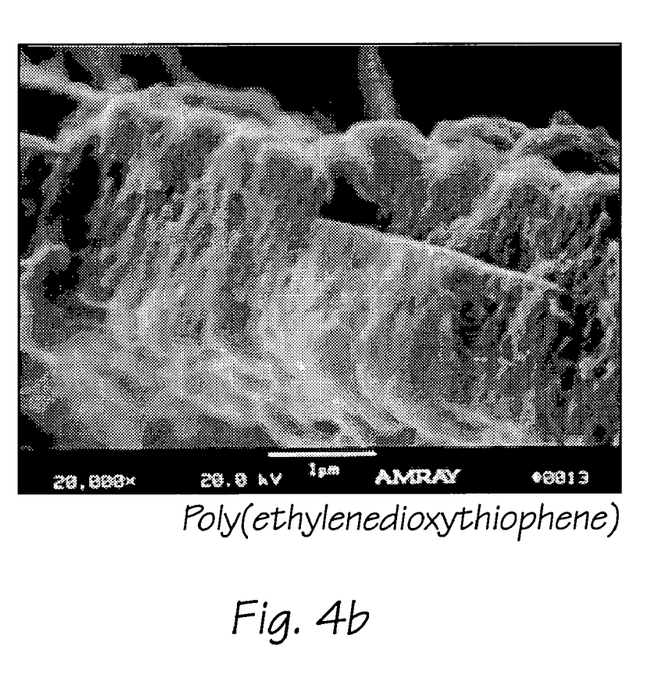

Referring to FIG. 3, data of X-ray diffraction shows a new composition of matter is obtained with high crystallinity. Order in the polymer's morphology is obtained as evidenced by the scanning electron micrographs, of FIGS. 4a and 4b, respectively.

Figure 5:
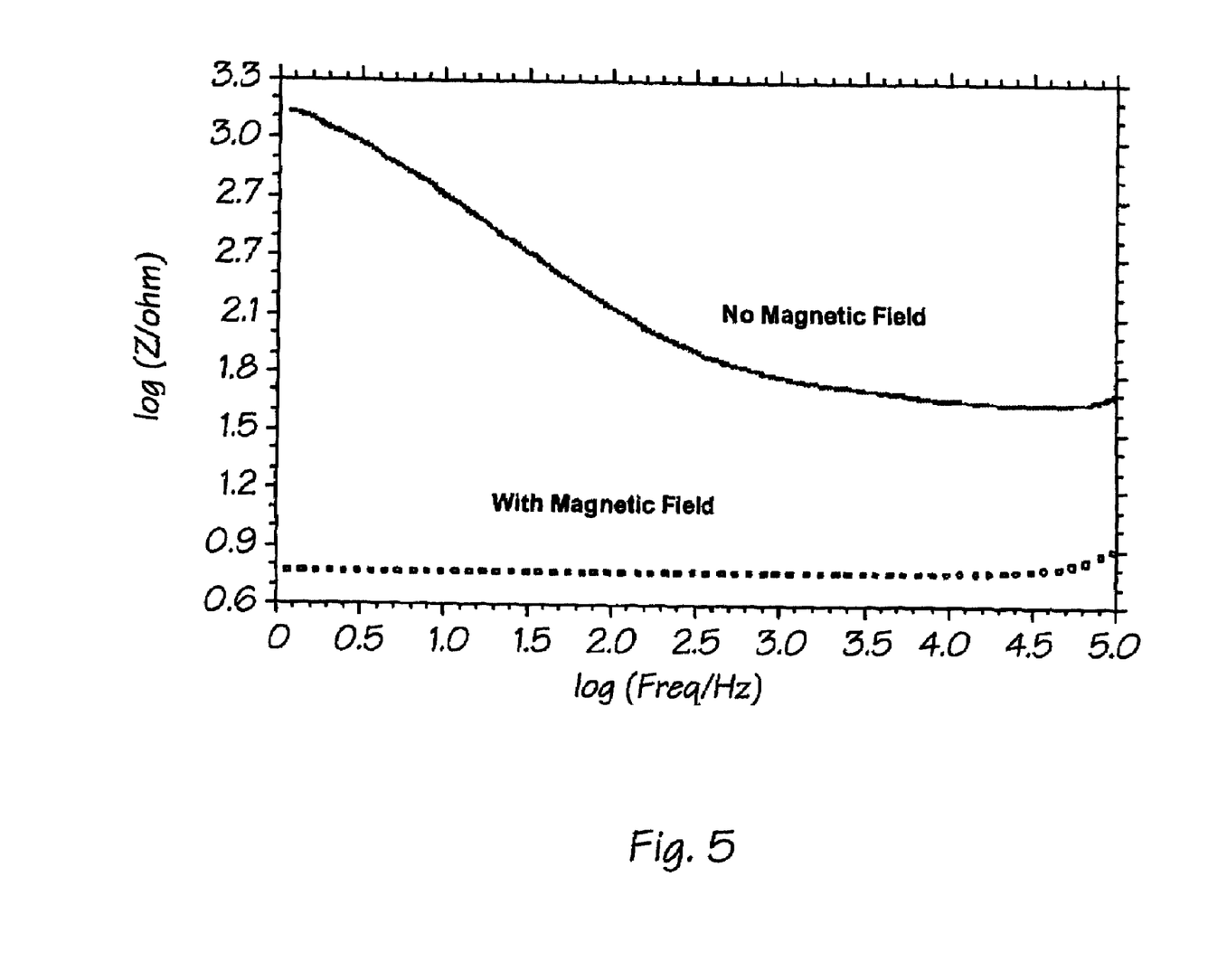
FIG. 5 depicts a plot showing the effect on impedance, using a magnetic field in the synthesis process.
Figure 6:
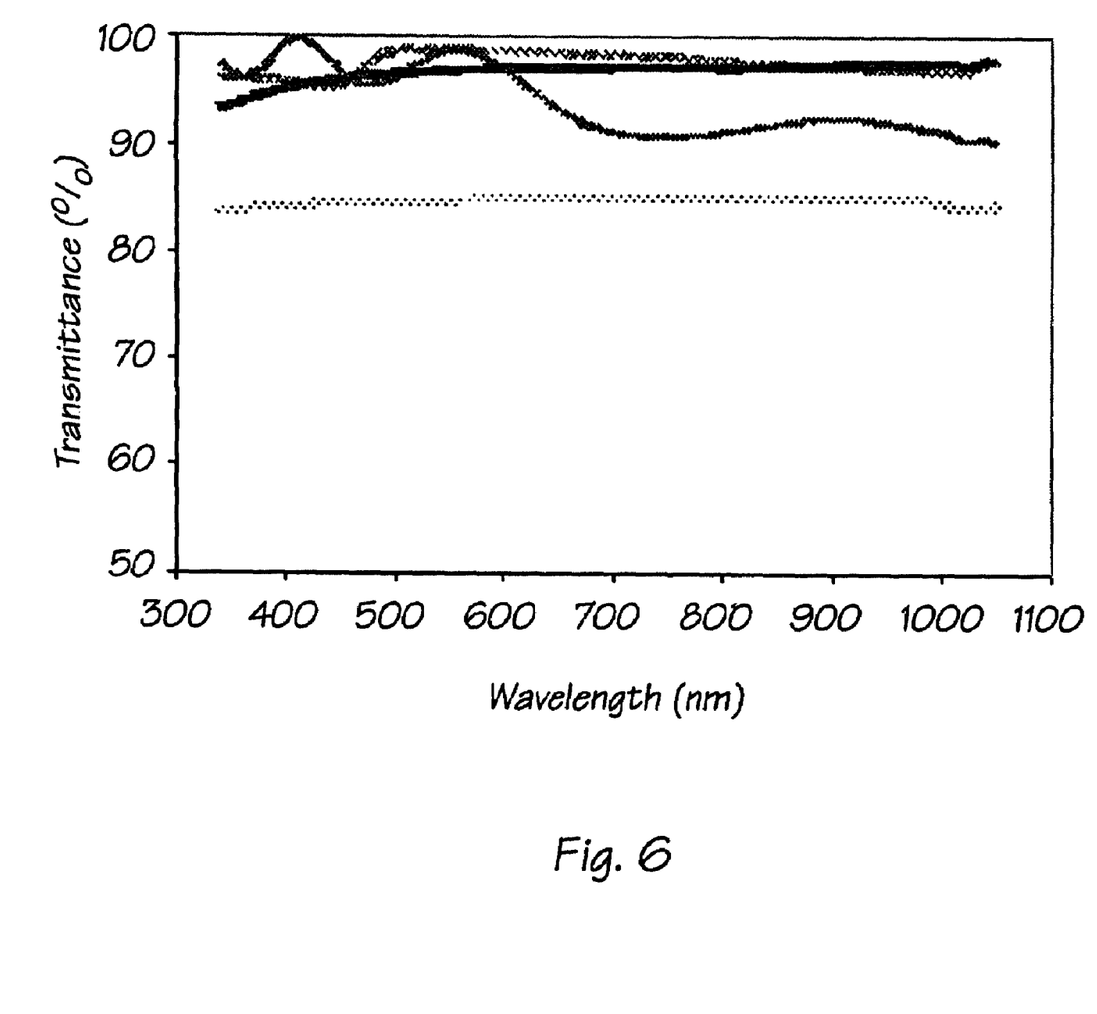
FIG. 6 shows a plot of UV-Visible spectra of various high conductivity polymer coatings.
Figure 7:
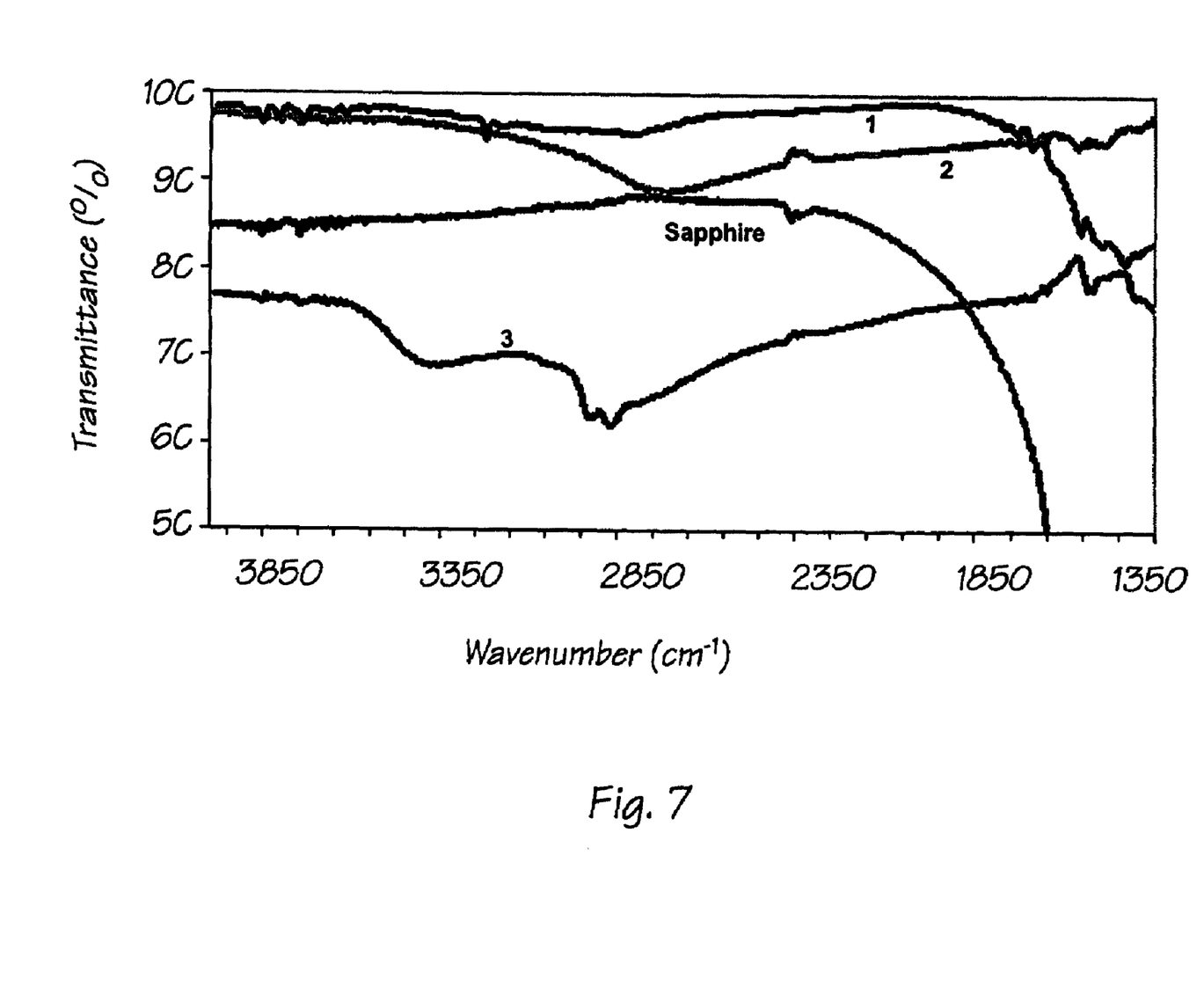
FIG. 7 illustrates a plot of infrared spectra of various high conductivity polymer coatings.

Referring to FIG. 5, the effect of the magnetic field is evident, where impedance is lower, than when a magnetic field is not used in the synthesis process. The high conductivity polymer is also transparent in the visible to near infrared range, as observed by the graphical data shown in FIG. 6, and in the middle infrared regions, as illustrated in FIG. 7.

2) Using the same apparatus, solvents that are organic, like acetonitrile, ethanol, etc. can be used.

Figure 8:
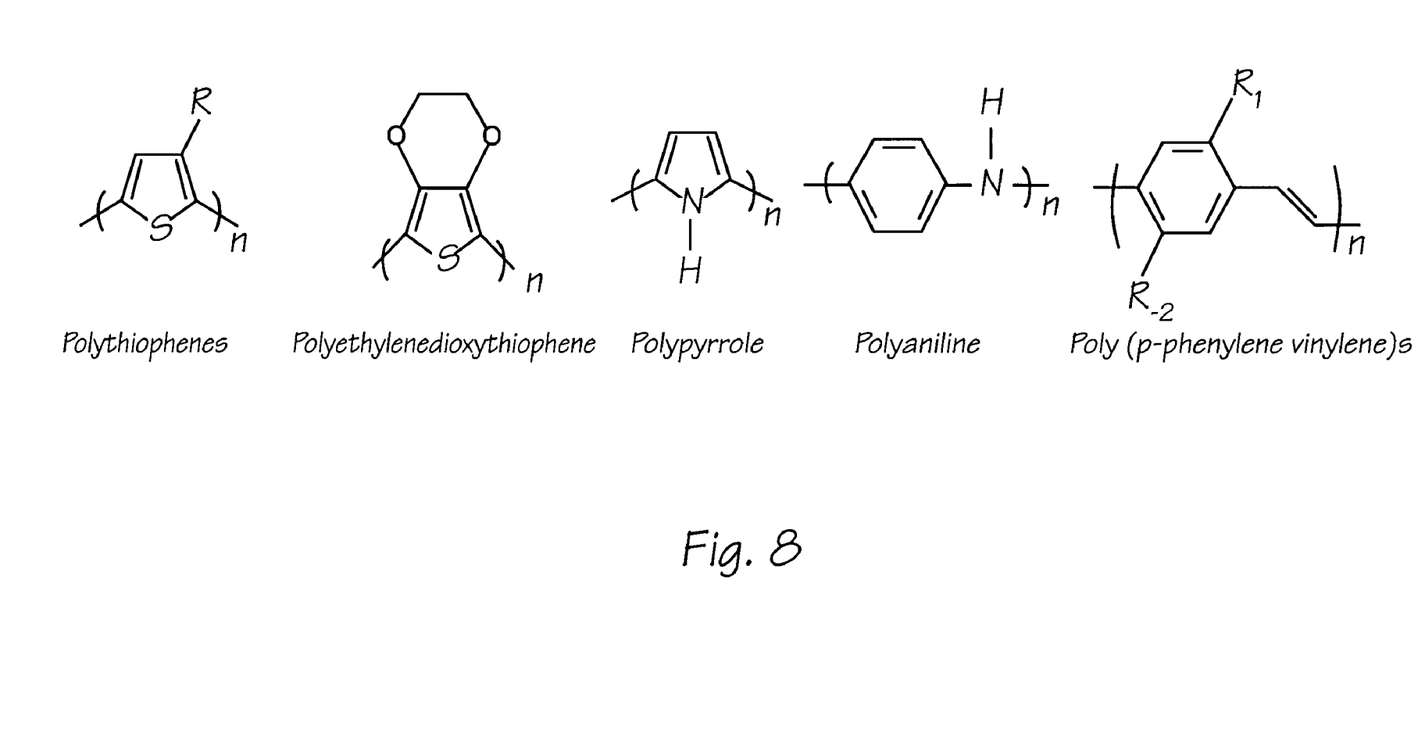
FIG. 8 depicts the chemical structure for various intrinsically conductive polymers.

3) Either organic or aqueous solvents with the monomer being thiophene, aniline, substituted anilines, phenylene vinylene, substituted phenylene vinylenes, alkylthiophenes, sulfonated alkylthiophenes, ethylene-dioxythiophene, substituted ethylene-dioxythiophenes, as shown in FIG. 8, can also be used in the apparatus of FIG. 1.

Figure 9:
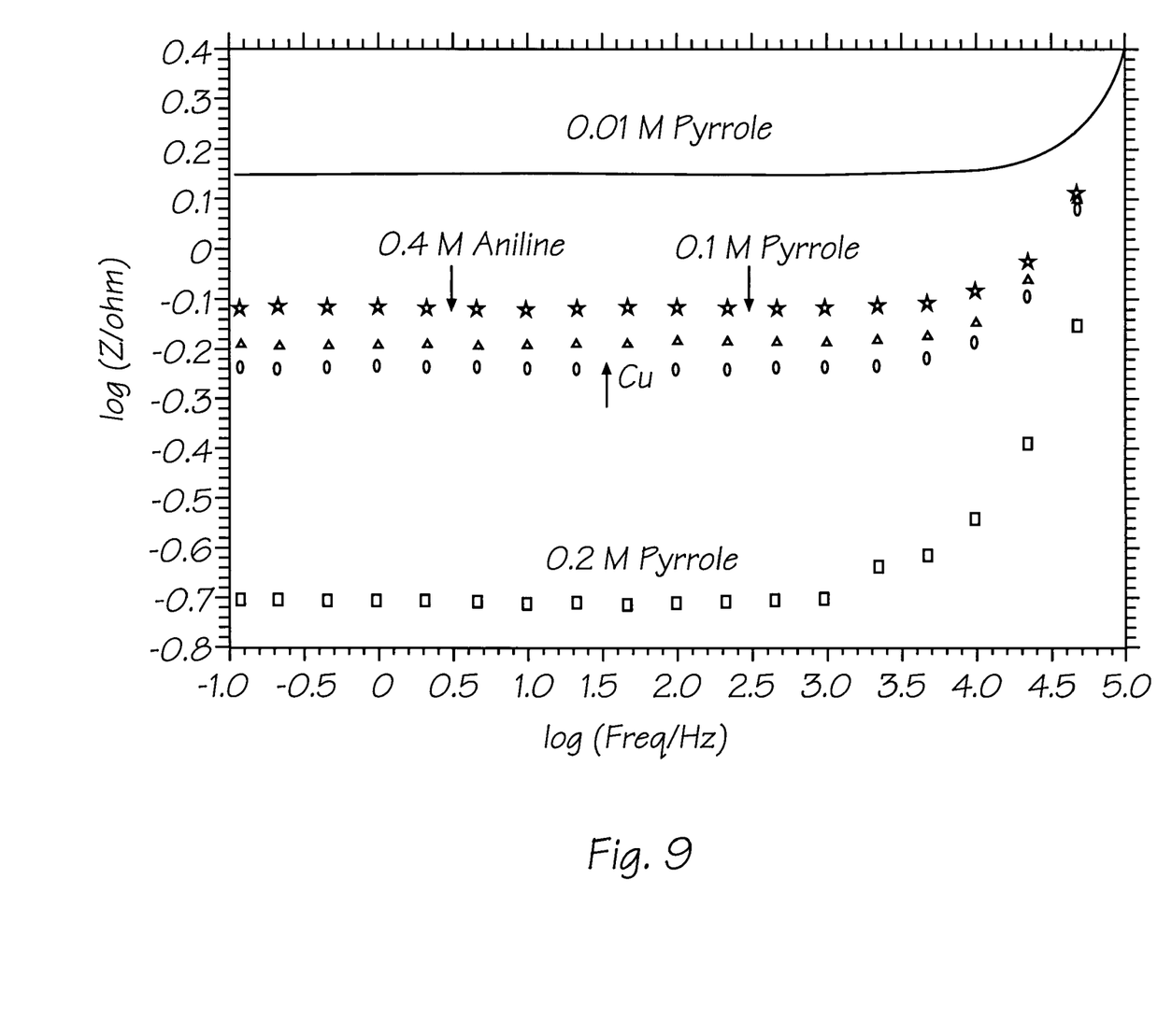
FIG. 9 shows a graph of the conductivity of various conducting polymers prepared from different monomer solution concentrations.

4) Using the same apparatus of FIG. 1, pre-synthesized polymers by chemical or electrochemical means are dissolved or dispersed in an aqueous or organic solvent (toluene, acetonitrile, ethanol, isopropanol, etc.) using up to 10 weight % polymer. Such polymers include the family of substituted and unsubstituted polypyrroles, polythiophenes polyanilines and polyphenylene vinylenes, etc. An electric field from a fraction of a volt to several volts is applied across the electrodes (no reference electrode), while a similar magnetic field as that used in Example 1 is applied. The polymer is electrophoretically deposited on the anode with thickness that increases with time. Conductivity of the resulting coating depends on the type of polymer, solvent and concentrations, as illustrated in FIG. 9. 5) Using the same example as described in Example 1 (using monomers), or Example 4 (using polymers) a coating is applied to a continuously moving wire 15, using the high conductivity polymer. The wire 15 is a non-magnetic wire such as: titanium, stainless steel, gold, platinum, etc., as shown by the apparatus illustrated in FIG. 10. The wire 15 is used as the anode 11.

6) Using the same example as Example 4, but instead of using the class of intrinsically conducting polymers, non-conjugated polymers with polar groups such as polymethacrylate, polypropylene oxide, etc., are used in organic solvents like toluene. The amount of polymer used is such that the polymer's concentration is up to 50 weight %. The electric field comprises an applied potential of 1 V or higher.

Figure 11:
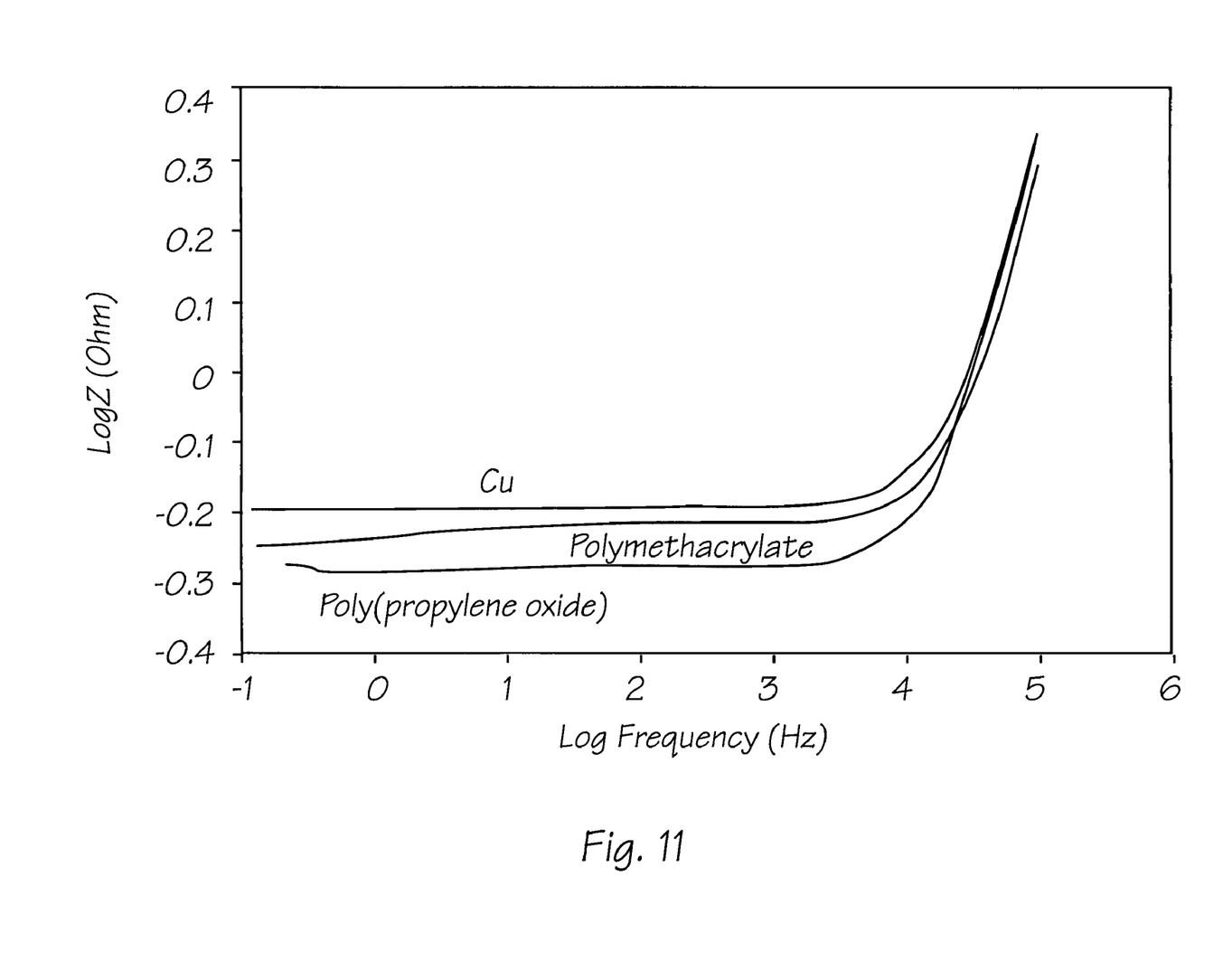
FIG. 11 depicts a plot of impedances for several materials.
Figure 12:
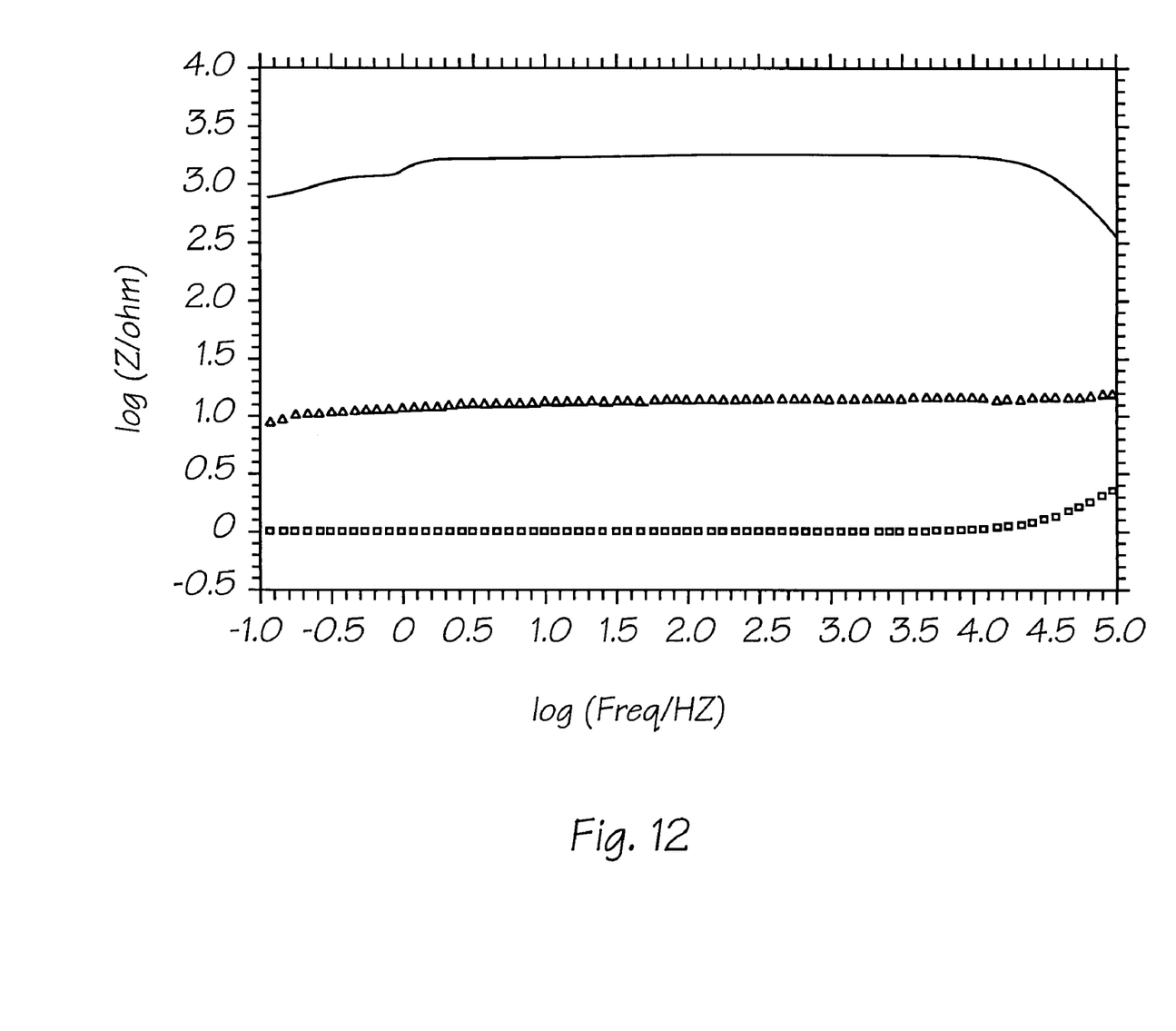
FIG. 12 shows a plot of impedance for poly-methacrylate films fabricated with and without a magnetic field.

Conductivity of the electrophoretically deposited films under a magnetic field is higher than that of copper, as illustrated in FIG. 11. Conductivity increases as the time during the time in which the polymer is subjected to the increasing magnetic field, as depicted in FIG. 12.

Figure 13:
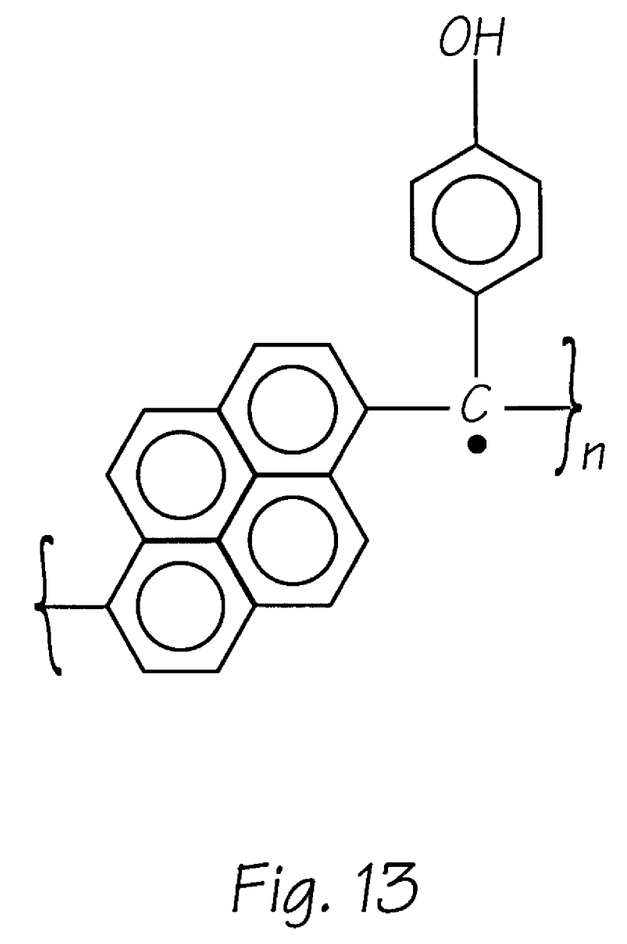
FIG. 13 illustrates the chemical structure for hydroxytriarylmethane ferromagnetic polymer.
Figure 14:
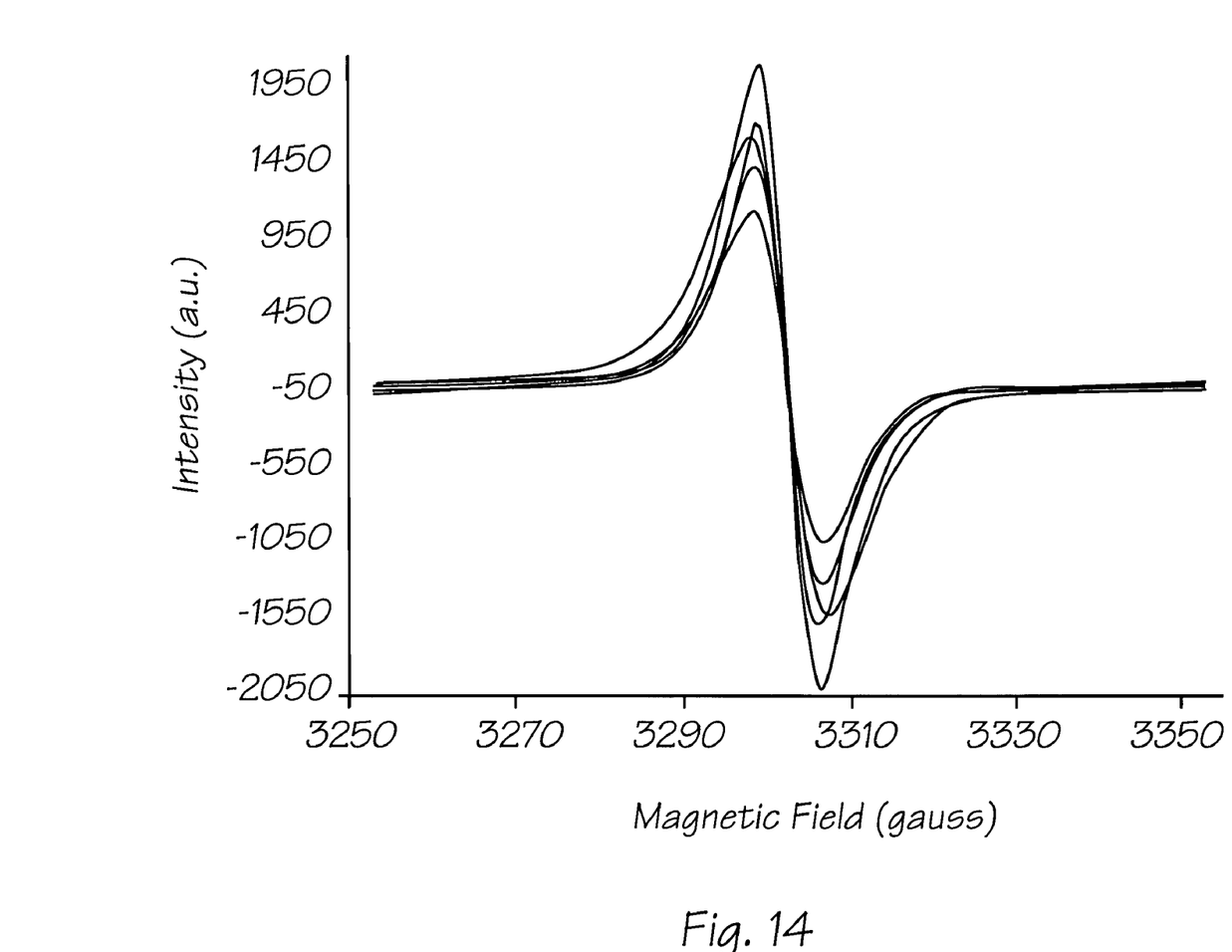
FIG. 14 shows a plot of electron spin resonance for a triarylmethane polymer at different temperatures.

7) Using the same example as Example 6, with the polymer being a ferromagnetic material at room temperature, such as that shown in FIG. 13, a high spin density ($>10^{21}$ spin/g) is obtained, as illustrated from the electron spin resonance data shown in FIG. 14. The permeability ($\mu$) value derived from peak area is 15.5.

Figure 15:
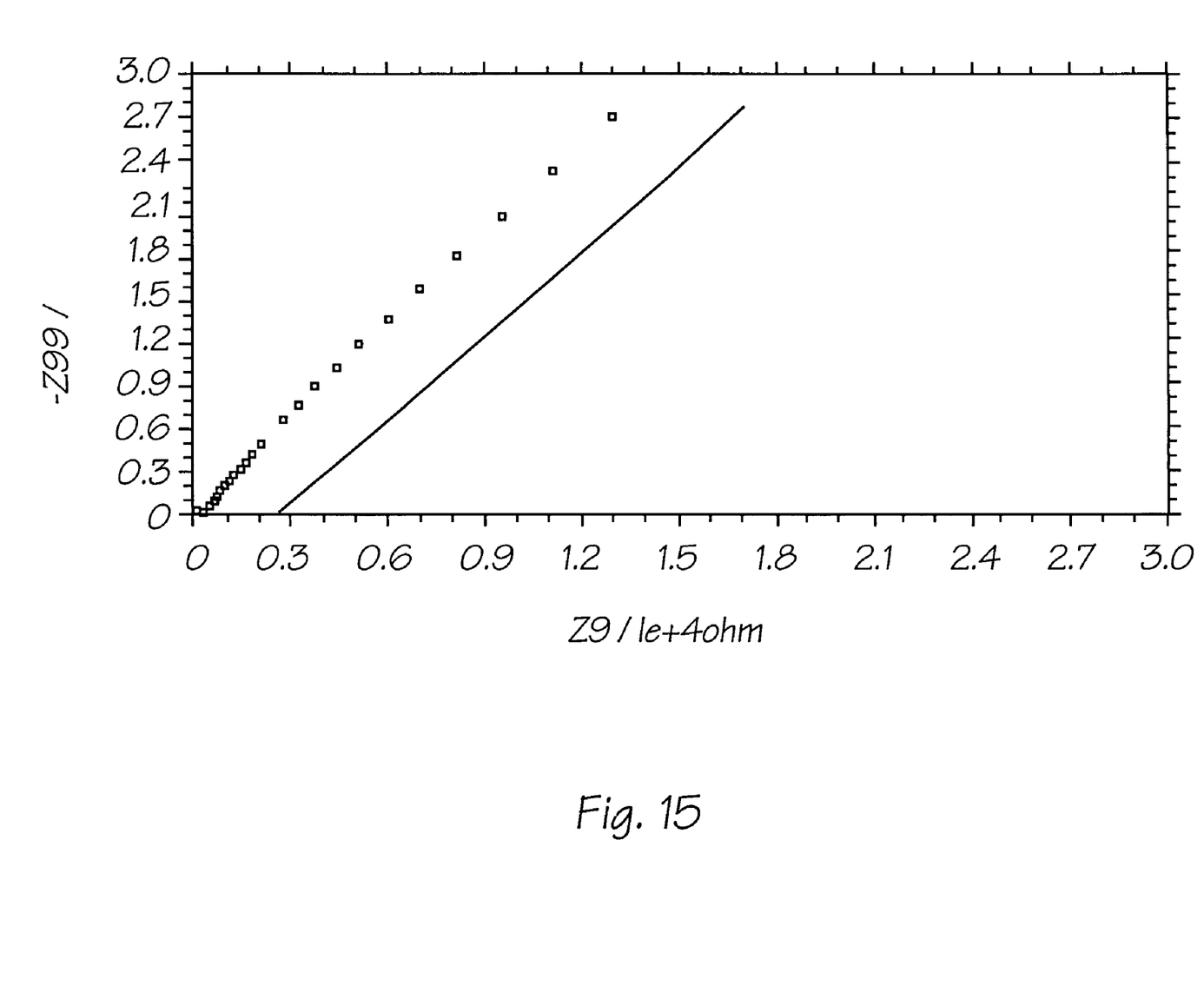
FIG. 15 is a plot of impedance for poly(ethylene oxide) solid polymer electrolyte with parallel and perpendicular orientation.

Utilizing the same example as Example 6, but wherein the polymer is polyethylene oxide, as a solid electrolyte membrane, anisotropy is evidenced by the lower resistance along the orientation direction than that in the perpendicular direction, as illustrated in FIG. 15.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of depositing a polymer on a surface, comprising: in the presence of both an electric field and a magnetic field parallel thereto, depositing a polymeric material comprising at least one of the group: a presynthesized polymer, a polymer electrochemically polymerized in the presence of both said electric field and said magnetic field, and a monomer electrophoretically deposited in the presence of both said electric field and said magnetic field, a resulting deposited polymer having a unique ordered structure and an electrical volume conductivity greater than the volume conductivity of copper.

2. The method of depositing a polymer as recited in claim 1, wherein said presynthesized polymer is selected from a class of conjugated polymers comprising at least one of: polypyrrole, and polythiophene.

3. The method of depositing a polymer as recited in claim 1, wherein said resulting deposited polymer is selected from a class of saturated polymers comprising at least one of the group: poly(vinylidene fluoride), polymethacrylate (PMA), triarylmethane polymers, and poly(ethylene oxide) (PEO).

4. The method of depositing a polymer as recited in claims 2 or 3, wherein said deposition is performed at an ambient temperature.

5. The method of depositing a polymer as recited in claims 2 or 3, wherein said surface comprises a wire and wherein said electric field is generated by passing an electric current therethrough.

* * * * *